Aug. 31, 1943.　　　H. KROCHMAL　　　2,328,346
DIVIDING HEAD
Filed Jan. 30, 1942　　　2 Sheets-Sheet 1

Inventor
Henry Krochmal,

By McMorrow & Berman
Attorneys

Aug. 31, 1943.   H. KROCHMAL   2,328,346
DIVIDING HEAD
Filed Jan. 30, 1942   2 Sheets-Sheet 2
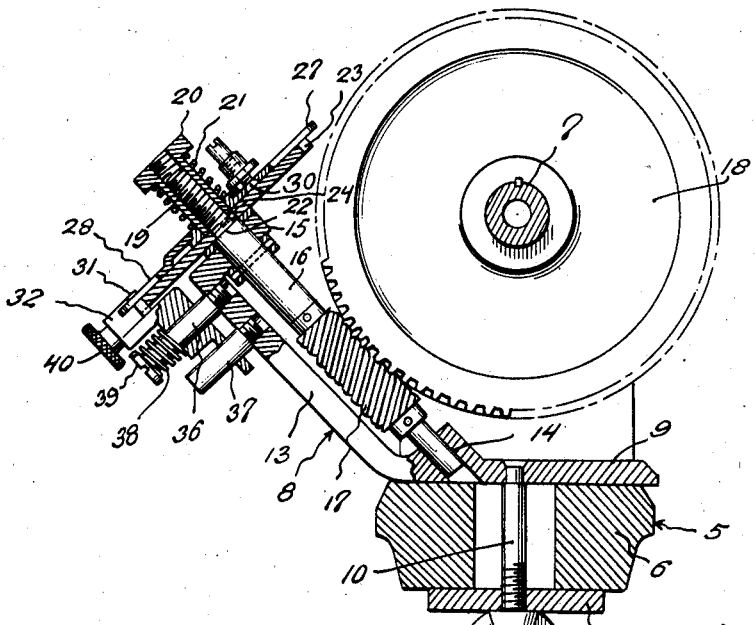
Fig. 2.
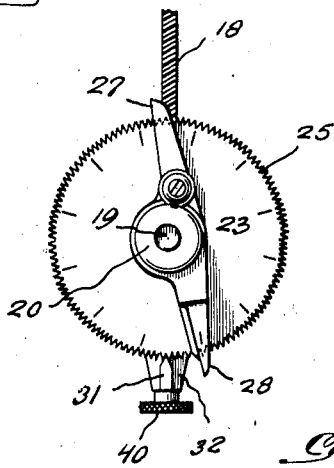
Fig. 3.
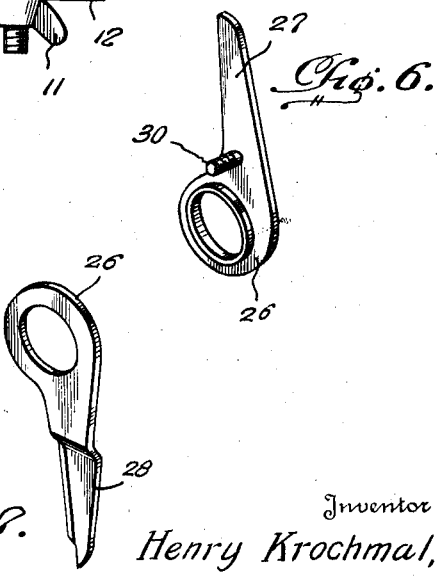
Fig. 6.
Fig. 7.
Inventor
Henry Krochmal,
By McMorrow & Berman
Attorneys Patented Aug. 31, 1943

2,328,346

UNITED STATES PATENT OFFICE 2,328,346

DIVIDING HEAD

Henry Krochmal, Elizabeth, N. J.

Application January 30, 1942, Serial No. 428,947

1 Claim. (Cl. 90—57)

This invention relates to a dividing head especially adapted for gear cutting and other similar work, and has for the primary object the provision of a device of this character which will permit said type of work to be accurately and quickly carried out on a lathe or similar machine and may be readily adapted to said type of machine and provides an extremely large range of accurate adjustments and eliminates the use of the conventional holed dividing plate commonly employed on dividing heads and employs a toothed dividing plate in lieu thereof, capable of being conveniently replaced by other similar dividing plates of different divisional adjustments, any one of which may be firmly secured in any adjusted position through the use of an improved and conveniently operated locking means coactive with the teeth of the dividing plate.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a fragmentary top plan view illustrating a portion of a lathe with a dividing head applied thereto and constructed in accordance with my invention.

Figure 2 is a sectional view taken on the line 2—2 of Figure 1.

Figure 3 is a plan view illustrating the improved dividing plate and the locking means therefor and the association of spacing arms with the dividing plate.

Figure 6 is a perspective view illustrating one of the spacing arms.

Figure 7 is a view similar to Figure 6 showing the other spacing arm.

Figure 1:
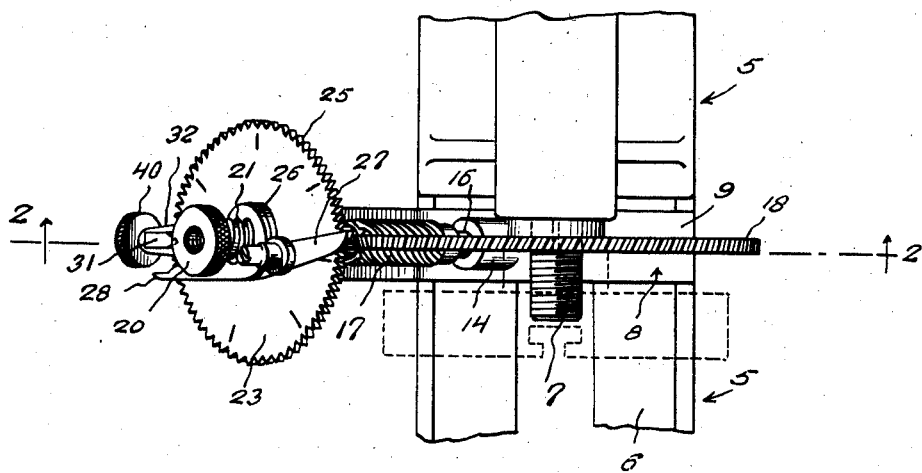
Figure 4:
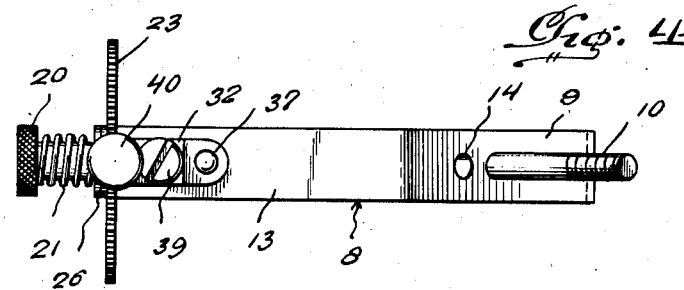
Figure 4 is a bottom plan view showing the supporting bracket of the present invention.
Figure 5:
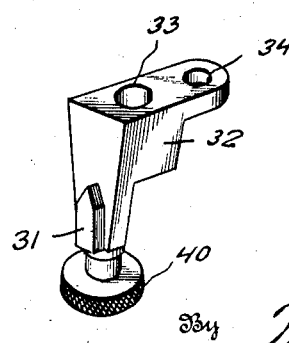
Figure 5 is a perspective view of a securing dog along with its attaching portion and finger piece.

Referring in detail to the drawings, the numeral 5 indicates a fragmentary portion of the lathe, 6 the rails of the bed of said lathe and 7 the lathe spindle on which the stock is mounted in the usual way such as employing a chuck or similar device. Said parts of the lathe are merely shown fragmentarily to give an understanding as to the application of the present invention to this type of machine so that gear cutting and other similar work may be accurately, rapidly and successfully carried out.

In order that the present invention may be easily and quickly adapted to the rails of a lathe bed, a supporting bracket 8 is provided which includes a plate-like portion 9 to rest flatly upon the rails and carries a bolt 10 provided with a wing nut 11 which bolt extends between the rails and through a clamping plate 12 so that when the nut is turned on the bolt, the bracket will be firmly anchored on the lathe.

The plate further includes an upwardly and outwardly extending arm 13, one end of which is integral with one end of the rest or plate 9 and the latter adjacent its formation onto the arm 13 is provided with a bearing 14 aligning with a bearing 15 formed on the free end of the arm 13. The bearings 14 and 15 coact in rotatably supporting an operating shaft 16 on which is secured a worm 17. The worm meshes with a worm gear 18 detachably secured on the spindle 7 for rotation therewith.

The operating shaft 16 is provided with a reduced screw threaded portion 19 on which is threaded a sleeve type nut 20 providing a seat for one end of a coil spring 21. The reduced screw threaded portion 19 defines a shoulder or seat 22 to be engaged by a dividing plate 23 when mounted on the reduced screw threaded portion and has a keyed connection therewith, as shown at 24.

The dividing plate is of an improved form and includes teeth 25 on its periphery and a scale on one of its faces.

Also removably mounted on the reduced screw threaded portion 19 of the operating shaft 16 are the overlapping hubs 26 of spacing or indicating arms 27 and 28. The other end of the coil spring bears against the hub of the outermost spacing or indicating arm. The arm 27 is provided with a screw threaded stud 30 on which a flanged nut is turned to engage the hub of the arm 28 whereby said arms may be releasably secured against movement relative to each other over the scale of the dividing plate.

Coactive with the teeth 25 of the dividing plate 23 is a holding dog 31 forming an integral part of a mounting 32, the latter being provided with spaced openings 33 and 34 to slidably receive pins 36 and 37 detachably secured to the arm 13 of the bracket 8. The pins 36 and 37 permit the mounting of the dog to have sliding movement on the bracket, that is, toward and from the arm 13 of said bracket for engaging and disengaging the dog 31 with the teeth of the dividing plate and will prevent said mounting from having rotation. The mounting is spring influenced by a coil spring 38 interposed between the head 39 of the pin 36 and the mounting 32. The action of the spring is to urge the dog 31 into engagement with the teeth of the holding plate to prevent said plate from accidentally moving out of a desired adjustment.

The sleeve type nut 20 provides a finger piece for the rotation of the operating shaft 16 and the rotation of the latter imparts rotation to the worm gear 18 for turning the stock carried by the spindle 7 of the lathe.

When an adjustment to the stock is desired, the dog is disengaged from the teeth of the dividing plate by a pull on a finger piece 40 provided on the mounting 32 and a desired adjustment of the stock may then be made by rotating the operating shaft 16 by the nut 20.

The sleeve type nut being threaded on the shaft 16 can be easily unthreaded therefrom to permit the removal of the dividing plate 23. This is desirable when one dividing plate is to be substituted for another.

In order to adjust the stock relative to the cutter of the lathe for accurately cutting gear teeth or other work therein, it is only necessary to refer to the divisional markings on the face of the dividing plate and the number of teeth to pass the catch during the rotation of the dividing plate by the nut 20, the catch being first disengaged from the teeth to permit the adjustment to be made and which will automatically engage with the teeth of said dividing plate as soon as manually released, effectively securing said dividing plate in its new place of adjustment and thereby locking the stock against accidental movement while being cut.

The spacing or indicating arms are employed in spacing the number of teeth to pass the catch when each adjustment or division results in more or less teeth than one complete revolution of the dividing plate. Said arms are adjustable relative to each other and the dividing plate and are secured against relative movement by the nut 24. Their positions on the dividing plate are held by the pressure of the spring 21.

While I have shown and described the preferred embodiment of my invention, it will be understood that minor changes in construction, combination and arrangement of parts may be made without departing from the spirit and scope of the invention as claimed.

Having thus described the invention, what I claim is:

In a dividing head, an arm, a plate integral with one end of the arm and arranged angularly to said arm and positioned horizontally on bed rails of a lathe locating said arm laterally of the bed rails and extending upwardly and outwardly from the rails, means releasably securing the plate on the rails and for adjustment endwise thereof, spaced aligned bearings on said arm, an operating shaft rotatably supported by said bearings and arranged thereby parallel to said arm, a dividing plate having a toothed periphery keyed on said shaft, a sleeve type nut removably mounted on the shaft and employed as a finger piece for rotating the shaft and bearing against the dividing plate, indicators overlying the dividing plate in superimposed relation to each other and journaled on the sleeve type nut, a coil spring mounted on the sleeve type nut with one end bearing against said nut and the other end bearing against one of the indicators to force the other indicator to bear against one face of the dividing plate and providing a yieldable drive between the indicators and the nut, means releasably connecting the indicators, spaced pins secured to the arm, a latch means slidable on said pins, spring means on one of said pins and urging the latch means to engage the toothed periphery of the dividing plate, and drive means connecting said shaft to a spindle of the lathe.

HENRY KROCHMAL.